United States Patent Office

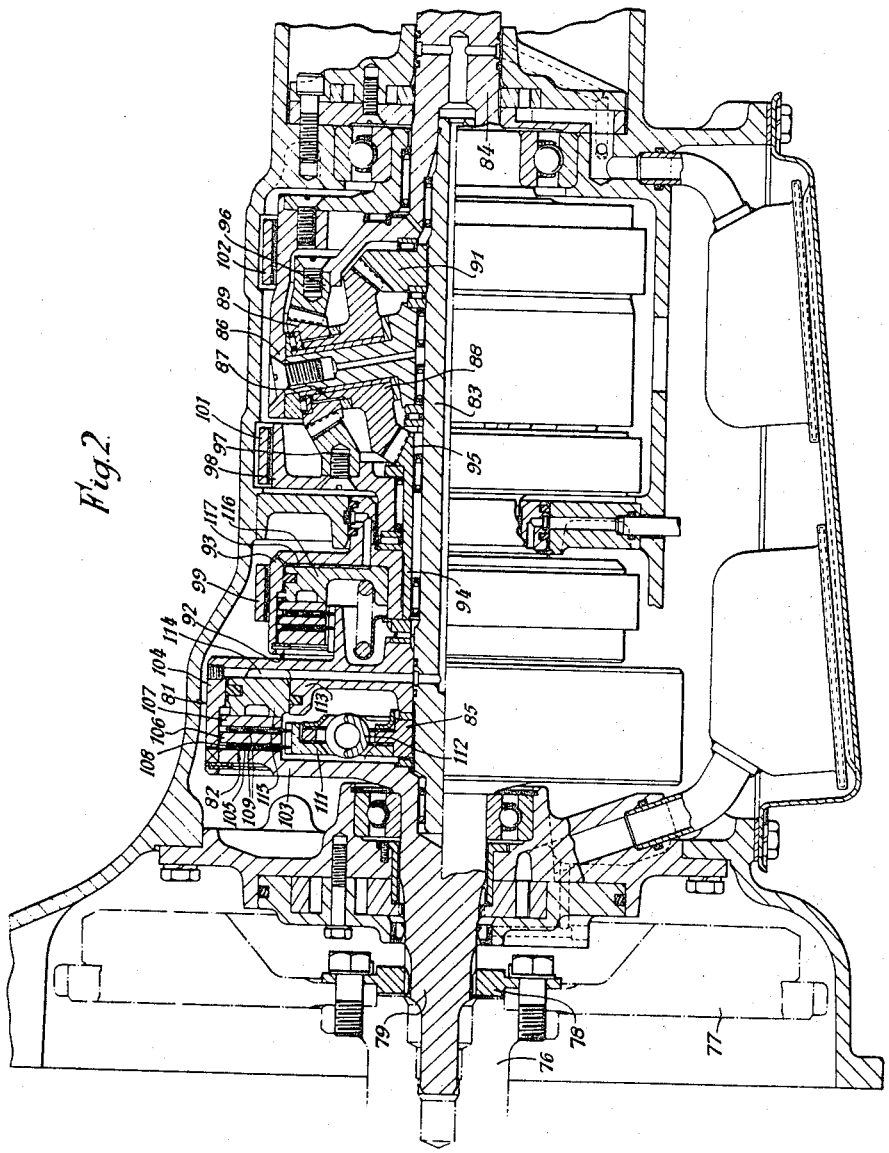

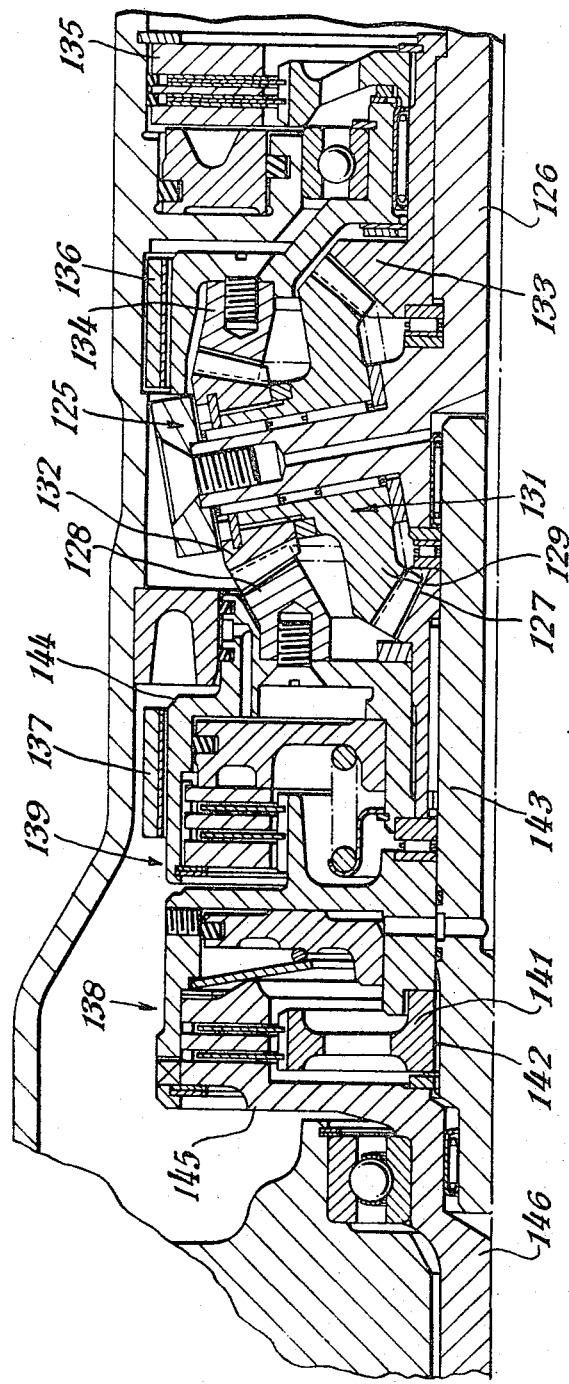

3,403,584
Patented Oct. 1, 1968

3,403,584
POWER TRANSMISSION SYSTEMS PROVIDING CHANGES OF GEAR RATIO
Frederick E. Ellis and Peter J. Standbridge, Leamington Spa, England, assignors to Automotive Products Company, Limited, Leamington Spa, England
Filed May 4, 1966, Ser. No. 550,579
Claims priority, application Great Britain, May 4, 1965, 9,303/65
7 Claims. (Cl. 74—757)

ABSTRACT OF THE DISCLOSURE

A power transmission mechanism using a speed reduction gear train comprising bevel gear clusters mounted on a carrier, the axes of the gear clusters lying in planes radiating from the axis about which the carrier is rotatable, and each of the said gear clusters comprising two bevel pinions rotatable together as one and the said bevel pinions meshing with other bevel gears rotatable about the same axis as that of the carrier.

---

This invention relates to automatic power transmission mechanism primarily for use in motor vehicles for transmitting power from an internal combustion engine to road wheels, the gear ratio of the said transmission changing automatically in accordance with varying speed and/or load conditions to maintain a ratio appropriate to the conditions at all times.

The power transmission mechanism embodies a speed reduction gear train of the kind comprising bevel gear clusters mounted on a carrier, the axes of the clusters lying in planes radiating from an axis about which the carrier is rotatable, and each of the said clusters comprising two bevel pinions rotatable together as one and the said bevel pinions meshing with other bevel gears rotatable about the same axis as is the carrier.

In such power transmission mechanism two of the bevel gears may be selectively drivable by the engine to act as input members, and either the carrier or another of the said bevel gears serves as an output member. By selecting the input member through which the drive is applied, and holding selected other elements of the gear train, various speed ratios between the input and output members can be obtained, and the direction of them drive can be reversed.

It is the object of the present invention to provide improved means for selectively driving the two bevel gears which act as input members.

According to the present invention the said input bevel gears are driven respectively through two friction clutches which are engageable by fluid pressure, one of said clutches comprising a housing mounted on a driving shaft and driven member enclosed in said housing and mounted on a shaft carrying one of said input bevel gears, and the other including a driving plate or plates carried by a cylindrical projection on said housing and co-operating with a driven plate or plates rotationally coupled to a second housing surrounding the said shaft and rotating as one with the other of said input bevel gears.

Preferably the friction clutches are of the multi-plate type and are urged into engagement by fluid pressure acting in annular motor cylinders formed in the housings.

The invention is hereinafter described with reference to the accompanying drawings, in which:

FIGURE 2 is a similar section through another form of speed reduction gear train and clutch assembly for a power transmission mechanism according to the invention; and FIGURE 3 is a similar section through another form of speed reduction gear train assembly according to the invention.

Figure 1:
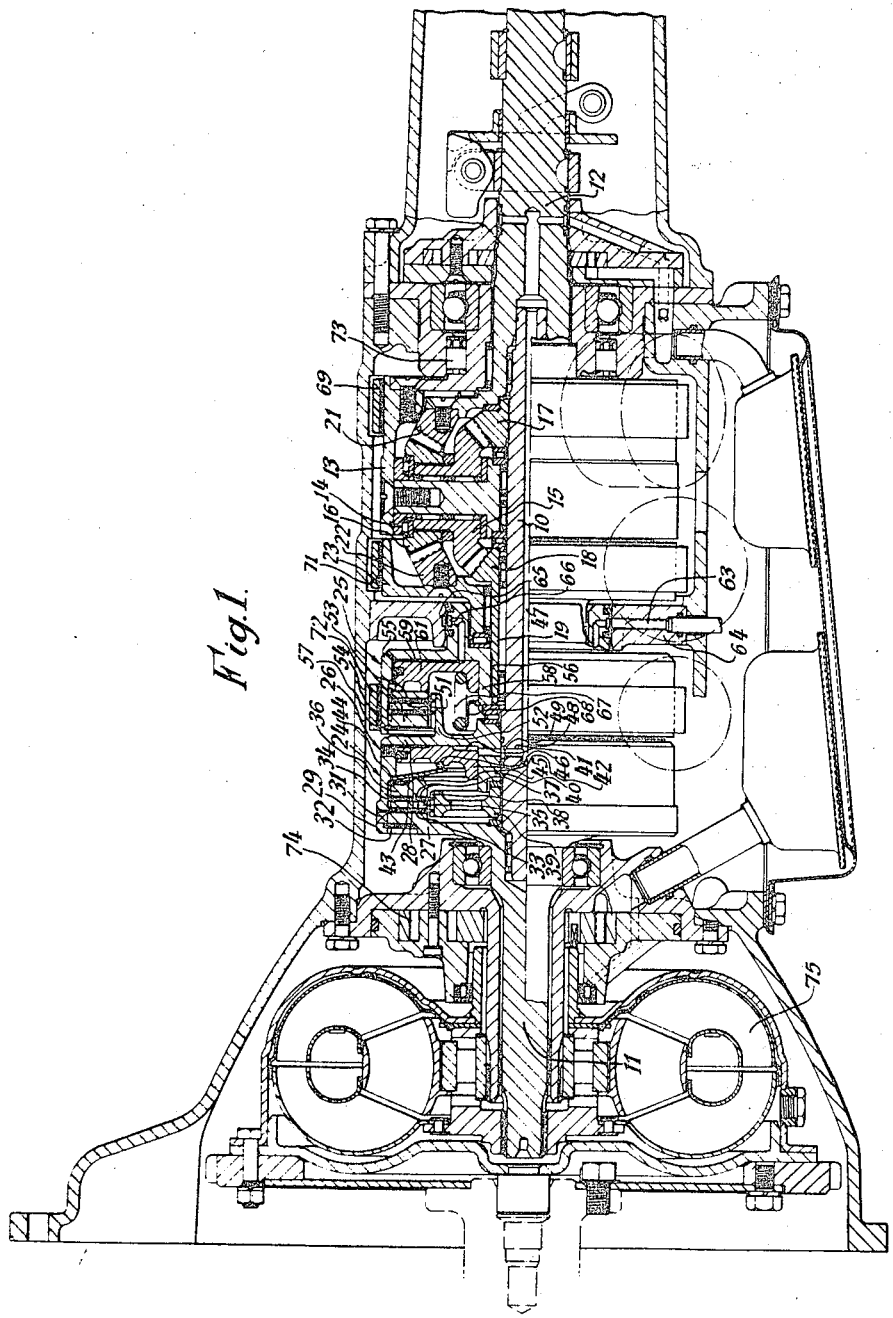
FIGURE 1 is a longitudinal section through one form of speed reduction gear train and clutch assembly for a power transmission mechanism according to the invention.

Referring to FIGURE 1 of the drawings, the gear train includes an intermediate shaft 10 spigoted at its ends into co-axial driving and driven shafts 11 and 12 respectively and having rotatably mouted on it a carrier 13 which supports, for rotation about axes in planes radial to the intermediate shaft axis and extending outwardly from said shaft axis, bevel pinion clusters 14 each comprising a larger inner bevel pinion 15 and a smaller outer bevel pinion 16 secured together to rotate as one. A first input bevel gear 17 mouted on the intermediate shaft 10 meshes with the larger bevel pinions 15 of the clusters, and a second input bevel gear 18 and hereinafter referred to as the reverse bevel gear, mounted on a sleeve 19 surrounding the intermediate shaft meshes with the said larger bevel pinions 15 at the opposite ends of diameters thereof. An output bevel gear 21 carried by the driven shaft 12 meshes with the smaller bevel pinions 16 of the clusters at the same side of the cluster axes as the first input bevel gear 17, and a fourth bevel gear 22, supported by a drum 23 rotatable about the sleeve 19, also meshes wtih the said smaller bevel pinions 16 at points opposite to the output bevel gear 21.

The two friction clutches which serve to connect the input bevel gear 17 and the reverse bevel gear 18 respectively to the driving shaft 11 are shown at 24 and 25 respectively. The clutch 24, which transmits the drive to the input bevel gear 17 comprises a cylindrical housing 26, of short axial length formed by a disc 27 integral with the driving shaft 11, and a drum-shaped part 28 formed with radial slots 29 in its edge into which extend radial lugs 31 on the disc 27, the parts being held together by a clip ring 32. The housing 26 constitutes the driving member of the clutch 24, a flat driving face 33 being formed on the disc 27, and the part 28 is internally splined at 34 to co-operate with an intermediate driving clutch plate 35 and a pressure plate 36, driven clutch plates 37 interposed between the driving face 33 and the plate 35, and between the said plate 35 and the pressure plate 36, being carried on splines at 38 on a hub member 39 splined to the intermediate shaft 10. The hub member 39 will be hereinafter referred to as the driven member of the clutch 24.

The inner end of the drum-shaped part 28 has an internal cylindrical wall 40 defining, with its peripheral wall, an annular cylinder 41 in which is slidably mounted on annular piston 42, and a stiff but resilient annular disc 43, divided at its inner part into radial fingers and located at its outer edge in a recess 44 in the drum wall, engages an annular rib 45 on the pressure plate 36 and a ring 46 of circular cross section located in an annular groove in the piston 42, the said disc 43 serving to transmit thrust from the piston 42 to the pressure plate 36 to engage the clutch. Fluid pressure to move the piston and engage the clutch is admitted to the annular cylinder 41 through a port in the wall 40, to which the fluid is supplied through an axial passage 47 in the intermediate shaft 10, and a radial passage 48 and groove 49 in the said shaft.

The second clutch 25 comprises driving plates 51 mounted on splines on an external cylindrical projection 52 on the drum-shaped part 28 and driven plates 53 engaging splines at 54 on the inner face of the cylindrical wall of a drum 55 coupled by splines at 56 to the sleeve 19. The outer one of the driven plates 53 abuts against a clip ring 57 mounted in the mouth of the drum 55. An internal cylindrical wall 58 integral with the drum 55 defines, with the external cylindrical wall thereof, an annular cylinder 59 in which is slidable an annular piston 61 on which fluid pressure acts, in the said cylinder 59, to apply engaging thrust to the plates of the cluth 25, the said cylinder 59 receiving fluid under pressure through a passage 63 in an annular wall 64 of the casing enclosing the gear train and opposed circumferential grooves 65 and 66 in the inner periphery of said wall 64 and in a cylindrical wall projecting outwardly from the drum 55. A coiled compression spring 67, acting between the piston 61 and a spring abutment 68 carried by the drum 55, serves to urge the piston 61 in a direction to release the clutch.

Band brakes 69, 71 and 72 are provided to hold against rotation the carrier 13, the fourth bevel gear 22 and the drum 55 of the clutch 25 respectively, and a freewheel 73, acting between the carrier 13 and the casing of the gear train prevents rotation of the said carrier in one direction.

The band brakes 69, 71 and 72 are engaged by fluid under pressure acting in motor cylinders (not shown) acting to contract the bands, and the supply of fluid to the said motor cylinders, and to the clutch operating cylinders 47 and 59, may be controlled in any desired manner, for example by valve means associated with a centrifugal governor. The fluid pressure medium may be a liquid placed under pressure by a pump such as the gear pump shown at 74.

The driving shaft 11 is driven by the engine of the vehicle through a fluid torque converter 75, for which may be substituted, if desired, a fluid flywheel or a centrifugal clutch.

The bevel gear set shown in FIGURE 1 provides four forward gear ratios and one reverse gear ratio, as follows:

A first (low) speed is provided by engaging the clutch 24 to drive the intermediate shaft 10. The carrier 13 is held against rotation by the free-wheel 73 so that the input bevel gear 17 rotates the bevel pinion clusters 14 about their axes, rotating the output bevel gear 21 at a lower speed.

A second forward speed is provided with the clutch 24 still engaged, by also applying the brake 71 to hold the fourth bevel gear 22, the bevel pinion clusters 14 now being caused to roll round the said bevel gear 22 to rotate the output bevel gear 21 at a speed greater than that for first speed.

The third forward speed is provided when the clutch 24 is engaged simultaneously with application of the brake 72 on the drum 55 of the clutch 25, the brake 72 holding the reverse bevel gear 18 against rotation so that the bevel pinion clusters 14 roll around the said gear 18 and the output bevel gear 21 is rotated at a higher speed than for the second speed.

A fourth forward speed (direct drive) is obtained by engaging both clutches 24 and 25 so that the input bevel gear 17 and the reverse bevel gear 18 rotate together and the carrier 13 and output bevel gear 21 rotate with them.

Reverse gear is obtained by engaging the clutch 25 and applying the brake 69 on the carrier 13, the reverse bevel gear 18 then rotating the bevel pinion clusters in the opposite direction to that in which they are rotated for the forward gears, and so rotating the output bevel gear 21 also in the opposite direction.

Referring now to FIGURE 2 of the drawings, an engine crankshaft, part of which is shown at 76 carries a flywheel 77 and also carries an internally splined ring 78 engaging with splines on an input shaft 79 of the variable ratio drive unit, which carries a housing 81, similar to the housing 26 of FIGURE 1, for a multiplate friction clutch 82, the said housing forming the driving member of the clutch. An intermediate shaft 83, journalled at one end in the input shaft 79 and at the other end in an output shaft 84, all three shafts being co-axial, has splined to it the driven member 85 of the clutch 82, and a carrier 86 for the planet pinion clusters 87 is rotatably mounted on the said intermediate shaft. The planet pinion clusters 87, which include larger inner planet pinions 88 and smaller outer planet pinions 89 fixed together to rotate as one, have their axes lying in planes radial to the intermediate shaft 83 but inclined in those planes to the said axis. A first input bevel gear 91 mounted on the intermediate shaft meshes with the inner planet pinions 88 of the clusters on the side of said clusters remote from the clutch 82, at which the axes of the clusters make an obtuse angle with the intermediate shaft.

A second multiplate friction clutch 92, similar to the clutch 25 of FIGURE 1, has its driven drum member 93 mounted on a sleeve 94 rotatable on the intermediate shaft 83, the sleeve 94 carrying a reverse bevel gear 95 meshing with the inner planet pinions 88 on the side of the cluster axes nearer to the clutches, where the axes of said clusters make an acute angle with the shaft 83. The second input bevel gear 95 is thus smaller than the first input bevel gear 91, and provides a greater gear reduction ratio with the said bevel pinions 88. An output bevel gear 96 is carried by the output shaft 84 and meshes with the outer planet bevel pinions 89 on the same side as the first input bevel gear 91.

A fourth bevel gear 97, carried by a drum 98 rotatably mounted on the sleeve 94, also meshes with the outer planet pinions 89, on the side of the planet cluster axes opposite to the output bevel gear 96.

A brake 99 is provided to hold the drum 93 of the second clutch 92 against rotation, and similar brakes 101 and 102 are provided to hold the fourth bevel gear 97 and the carrier 86 respectively.

The housing 81 of the clutch 82, as in the previously described embodiment, comprises a disc 103 integral with the input shaft 79 and a drum-shaped part 104 secured to the edge of the disc 103 in the manner previously described. A flat annular driving face 105 on the disc 103 co-operates with an intermediate driving plate 106 and a pressure plate 107 carried by internal splines at 108 on the drum-shaped part 104 to provide a series of opposed driving faces between which are positioned driven clutch plates 109 mounted on splines on a flanged disc 111 carried by the hub 85 which constitutes the driven member of the clutch 82. The flanged disc 111 is mounted for limited rotational movement on the hub 85, coiled compression springs 112 being mounted in openings forming a circular series around the axes of the clutch in the manner well known in conventional friction clutch driven plates, to absorb angular vibrations and facilitate smooth clutch engagement.

A cylindrical wall 113 projecting inwardly from the end wall of the drum-shaped part 104 defines, with the peripheral wall of the said part 104, an annular cylinder 114 in which is slidable an annular piston 115 of substantially the same radial width as the clutch plates, the said piston bearing directly on the pressure plate 107. Fluid pressure acting in the cylinder 114 therefore acts through the piston 115 to apply an engaging thrust to the plates of the clutch 82.

The clutch 92 is substantially identical with the clutch 25 described with reference to FIGURE 1, and is operated by a similar piston 116 slidable in a cylinder 117 in the drum-shaped housing 93.

As will be observed, the plates 106, 107 and 109 of the clutch 82 have a substantially greater mean radius than the plates of the clutch 92, and also have a greater radial width, so that the effective area of the said plates in the clutch 82 is considerably larger. Also, the effective area of the piston 115 is considerably greater than the effective area of the piston 116, so that, with equal pressures acting on the two pistons, the engaging thrust on the clutch 82 is greater than the engaging thrust on the clutch 92.

The clutch 82 thus has a greater torque capacity than the clutch 92, and can be used to take up the drive when starting the vehicle from rest, so that the need for an additional drive take-up device, such as a fluid torque converter, fluid flywheel or centrifugal clutch is eliminated.

The brakes 99, 101 and 102, are conveniently applied by fluid under pressure acting in motor cylinders (not shown) to contract the bands constituting the said brakes.

Fluid pressure to engage the clutch 82 is supplied through a passage 118 in the intermediate shaft 83, and fluid pressure to engage the clutch 92 is supplied through passages 119 in the casing 121 enclosing the drive unit. The fluid employed may be oil placed under pressure by a gear pump 122 driven by the input shaft 79. The control means for directing the fluid pressure to the various motor cylinders engaging the brakes, and to the clutch casings, may be of any suitable kind as referred to in the description of FIGURE 1.

The bevel gear set shown in FIGURE 2 provides four forward gear ratios and one reverse gear ratio, as follows:

A first (low) speed is provided by engaging the clutch 82 to drive the intermediate shaft 83 and the first input bevel gear 91, and also engaging the brake 102 to hold the carrier 86 against rotation. The bevel clusters 87 are thus rotated about their axes to rotate output bevel gear 96 at a lower speed than the input bevel gear 91.

A second speed is provided by engaging the clutch 82 as for the first speed and also engaging the brake 101 on the fourth bevel gear 97, thus causing the planet clusters 87 to roll around the said fourth bevel gear 97 and rotate the output bevel gear at a higher speed than when first gear is in operation.

A third speed is provided by engaging the clutch 82 as for the first and second speeds and also engaging the brake 99 to hold the reverse bevel gear 95 against rotation. The planet clusters then roll around the said second input bevel gear, giving a lower gear reduction ratio than in the case of the second speed.

A fourth speed is provided by engaging both clutches 82 and 92, so that the whole gear unit rotates bodily about the axis of the intermediate shaft 83, giving a direct drive.

Reverse drive is provided by engaging the clutch 92 and applying the brake 102, so that the carrier is held against rotation and the bevel pinion clusters are driven by the reverse bevel gear 95, driving the output bevel gear 96 in the opposite direction to that for the forward speeds.

The gear set shown in FIGURE 2 provides the same advantages as that shown in FIGURE 1, with the additional advantage that a greater degree of choice of gear ratios is available by selection of the angle of the axes of the bevel pinion clusters to the axis of the intermediate shaft, and to the fact that the first forward speed ratio and the reverse speed ratio can be different one from the other.

In the arrangement shown in FIGURES 1 and 2 of the drawings, the output member of the speed reduction gear train is a bevel gear (21 in FIGURE 1 and 96 in FIGURE 2), and the input bevel gears (17 and 18 in FIGURE 1 and 91 and 95 in FIGURE 2) are positioned one on each side of the axes of the bevel pinion clusters. In the arrangement shown in FIGURE 3, the carrier 125 is fixedly mounted on an output shaft 126, and the input bevel gear 127 and reverse bevel gear 128 mesh respectively with the inner bevel pinions 129 of the bevel pinion clusters 131 and with the outer bevel pinions 132 of the said clusters, on the same side of the axes of the said clusters. Two further bevel gears 133 and 134, co-axial with the input bevel gears, mesh with the inner and outer bevel pinions 129 and 132 respectively on the other side of the axes of the said clusters, the bevel gears 133 and 134 being capable of being held against rotation, by a multi-plate clutch-like brake 135 and a band brake 136 respectively, to enable those bevel gears to serve as reaction members for the forward speed reduction ratios. The second input bevel gear 128 is also capable of being held against rotation by a band brake 137 to provide a reaction member for reverse drive.

The multi-plate clutches for transmitting drive from the engine to the input bevel gear 127 and reverse bevel gear 128 are shown at 138 and 139 respectively, and are substantially identical with the clutches 24 and 25 shown in FIGURE 1, so they will not be described in detail herein. The driven member 141 of the clutch 138 is mounted on splines at 142 on an intermediate shaft 143 to which is keyed the first input bevel gear 127, and the driven drum member 144 of the clutch 139 has the second input bevel gear 128 mounted directly on it.

The bevel pinion clusters 131 are mounted to revolve about axes inclined to the axis of the intermediate shaft 143, in planes radial to the said axis.

The driving member 145 of the clutch 138 is mounted on an input shaft 146 which may be coupled to the engine crankshaft through a fluid flywheel, a fluid torque converter, or a centrifugal clutch.

The various gear ratios are obtained as follows:

A first forward (low) ratio is obtained by engaging the clutch 138 and the brake 136, so that the bevel pinion clusters are driven by the input bevel gear 127, and roll around the bevel gear 134, rotating the carrier 125 at a lower speed than the intermediate shaft 143.

A second forward ratio is provided by engaging the clutch 138 and the brake 135, so that the bevel pinion clusters are again driven by the input bevel gear 127, but roll around the bevel gear 133, rotating the carrier 125 at a speed rather higher than that for the first ratio.

Third and fourth forward gears are both provided by engaging the clutch 139 and by applying the brakes 136 and 135 respectively, so that the bevel pinion clusters are driven by the reverse bevel gear 128 and roll respectively around the bevel gears 134 and 133, giving two different gear reduction ratios both higher than that for second gear.

A fifth forward ratio (direct drive) is obtained by engaging both clutches 138 and 139, thus causing the whole gear train to rotate, driving the output shaft 126 at the same speed as the input shaft 146.

The reverse drive is obtained by engaging the clutch 138 and applying the brake 137, so that the bevel pinion clusters are driven by the input bevel gear 127 and roll around the reverse bevel gear 128, thus driving the carrier 125 and the output shaft 126 in the opposite direction to that in which it is driven when the forward gears are in operation.

This arrangement of the bevel gear train provides five forward speeds, as compared with four which are obtainable with the previously described arrangements.

We claim:

1. An automatic power transmission mechanism embodying a speed reduction gear train of the kind referred to, comprising input bevel gears, two frictional clutches, housing means and shaft means, and means wherein the input bevel gears are driven respectively through said two friction clutches which are engageable by fluid pressure, the first of said clutches comprising a shaft, driven plate means, a driving shaft, a driven member and a housing mounted on said driving shaft and said driven member enclosed in said housing and mounted on said shaft carrying one of said input bevel gears, and the other of said clutches including a second housing and a driving plate means carried by a cylindrical projection on said housing of said first clutch and co-operating with said driven plate means rotationally coupled to said second housing surrounding the said shaft and rotating as one with the other of said input bevel gears.

2. An automatic power transmission mechanism according to claim 1, including annular motor cylinders formed in said housings and wherein the frictional clutches are comprised of multi-plate means and are urged into engagement by said fluid pressure acting in said cylinders.

3. An automatic power transmission mechanism according to claim 2, wherein the clutch housing mounted on the driving shaft comprising a disc integral with the said shaft and a drum-shaped part formed with radial slots in its edge into which extend radial lugs on the said disc, and means to retain said lugs in said slots.

4. An automatic power transmission according to claim 3, including a sleeve and other input bevel gear wherein the second housing is mounted for rotation with said sleeve which also carries said other input bevel gear.

5. An automatic power transmission mechanism according to claim 4, wherein the said other input bevel gear is mounted on the second housing.

6. An automatic power transmission mechanism according to claim 3, wherein said first clutch comprises plates having a greater mean radius than the plates of said other clutch so that the effective area of the plates of said first-mentioned clutch is greater than the effective area of the plate means of said other clutch.

7. An automatic power transmission mechanism according to claim 6, wherein the motor cylinder for engaging the said first clutch has a piston of greater effective area than the piston of the motor cylinder for engaging the said other clutch.

References Cited

UNITED STATES PATENTS

| | | | |
|---|---|---|---|
| 1,334,791 | 3/1920 | Pollard | 74—757 |
| 2,220,174 | 11/1940 | Ravigneaux | 74—759 |
| 2,862,403 | 12/1958 | Miller | 74—763 |
| 3,164,035 | 1/1965 | Ellis et al. | 74—757 |

FRED C. MATTERN, Jr., *Primary Examiner.*

ARTHUR T. McKEON, *Assistant Examiner.*